United States Patent
Borck et al.

[11] 3,897,860
[45] Aug. 5, 1975

[54] WET CLUTCH WITH COOLANT DISTRIBUTOR

[75] Inventors: Howard O. Borck, Detroit; Robert W. Zirbes, Rochester, both of Mich.; Leo W. Cook, Chicago, Ill.

[73] Assignee: Borg-Warner Corporation, Chicago, Ill.

[22] Filed: Nov. 19, 1973

[21] Appl. No.: 416,919

[52] U.S. Cl. ............................ 192/113 B; 188/264 E
[51] Int. Cl. ................................................ F16d 13/72
[58] Field of Search .......................... 192/113 B; 188/264 E, 264 AH

[56] References Cited
UNITED STATES PATENTS

| | | | |
|---|---|---|---|
| 1,070,753 | 8/1913 | Utz | 192/113 B X |
| 1,415,690 | 5/1922 | Parret | 192/113 B X |
| 2,788,877 | 4/1957 | Richardson | 192/113 B |
| 2,794,526 | 6/1957 | Canfield | 192/113 B X |
| 2,956,649 | 10/1960 | Kelley | 192/113 B X |

*Primary Examiner*—Benjamin W. Wyche
*Attorney, Agent, or Firm*—James A. Geppert

[57] ABSTRACT

A wet clutch assembly comprising an integral sealed housing adapted to be mounted on an engine flywheel and providing a sump for cooling fluid. The clutch includes a driving member and a driven member or clutch disk having integral hook-shaped scoops or diverters about its outer periphery adapted to dip into the sump, each scoop having a finger portion tapered in a direction opposite the direction of rotation and providing a curved ramp on its inner edge which functions to divert the fluid radially inwardly of the disk into a diagonal slot from which the fluid feeds into grooves in friction facings which are supported on the disk. The diverters present a narrow profile which minimizes turbulence in the oil so that its flow is controlled, frothing prevented and less heat is generated.

12 Claims, 5 Drawing Figures

PATENTED AUG 5 1975　　3,897,860

SHEET 2

WET CLUTCH WITH COOLANT DISTRIBUTOR

DISCUSSION OF THE PRIOR ART

Various arrangements have been proposed to dissipate heat from the friction linings of clutch plates. The solution to this problem by means of introducing fluid between the friction lining is made difficult by centrifugal forces tending to sling the fluid radially outwardly of the plates. Fully engaged, all members including the mass of oil under the influence of centrifugal force revolve together with no churning. Heretofore, scoops have been fastened to members of a clutch pack to dip into the sump of the clutch housing. These scoops were in the form of tubes which are curved to provide a leading inlet port and trailing outlet port. Because of the restricted area of entry and discharge, such scoops are difficult to fill with the fluid which bridges over the inlet. The high pressures and friction developed also tends to heat the fluid and the parts. The assembly is costly and bulky which is difficult to fit into restricted space limitation.

SUMMARY OF THE INVENTION

This invention is directed to a novel wet clutch assembly wherein at least one of the disks is provided with integral peripheral diverters, preferably formed as stampings of the plate.

A further object is to provide in a clutch a plate having diverters which provide small profile to the impingement of fluid thereagainst so as to minimize churning of the fluid and consequent excessive heating thereof.

Another object is to provide a clutch disk having a plurality of circumferentially spaced segments defining diagonally disposed slots therebetween, each segment having an integral diverter on its outer periphery which includes a finger portion extending circumferentially of the disk in a direction opposite to the direction of rotation thereof beyond the slot thereinfront and overlapping the trailing portion of the preceding segment and thereby defining a fluid inlet therewith leading into the slot for forcing fluid inwardly of the clutch contra the centrifugal force and into friction facings mounted on the segment and having passages communicating with the respective slots.

A more specific object is to provide in a clutch plate formed of a plurality of circumferentially spaced segments with intervening diagonally disposed slots, an arrangement of friction linings on the sides of the segments with fluid distributing grooves which communicate with the slots to effectively receive the fluid being pumped into the slots by diverters formed on the radially outer ends of the segments and projecting beyond the slot in front thereof.

Another object is to provide a novel clutch disk formed of sections of simple manufacture wherein fluid diverters are formed as a stamping with the section.

A still further object is to provide in a friction clutch a plate having integral peripheral diverters of the thickness of the plate to present a narrow fluid scooping profile comprising a fluid guide surface having a width of the thickness of the plate, the plate being flanked by other plate elements of the clutch assembly of larger diameter than the plate and outwardly of the plate being spaced axially from the diverters and defining a fluid channel therebetween for confining the coolant fluid and in conjunction with the diverter functioning to force the fluid radially inwardly of the clutch pack onto the friction faces carried by the clutch plate.

A still further object is to provide a self-cooling clutch comprising an output plate and a pair of input plates flanking the output plate and wherein the output plate has transverse slots therein and diverters at its periphery for slinging coolant fluid into the slots, the input plates closing the sides of the slots when engaged to form passageways for the fluid.

A still further object is the utilization of a minimum amount of cooling fluid sufficient during operation to immerse said diverters to cause fluid circulation and yet not so abundant that excess churning and heat is developed.

These and other objects and advantages inherent in and encompassed by the invention will become more apparent from the specifications and the drawings wherein.

Figure 1:
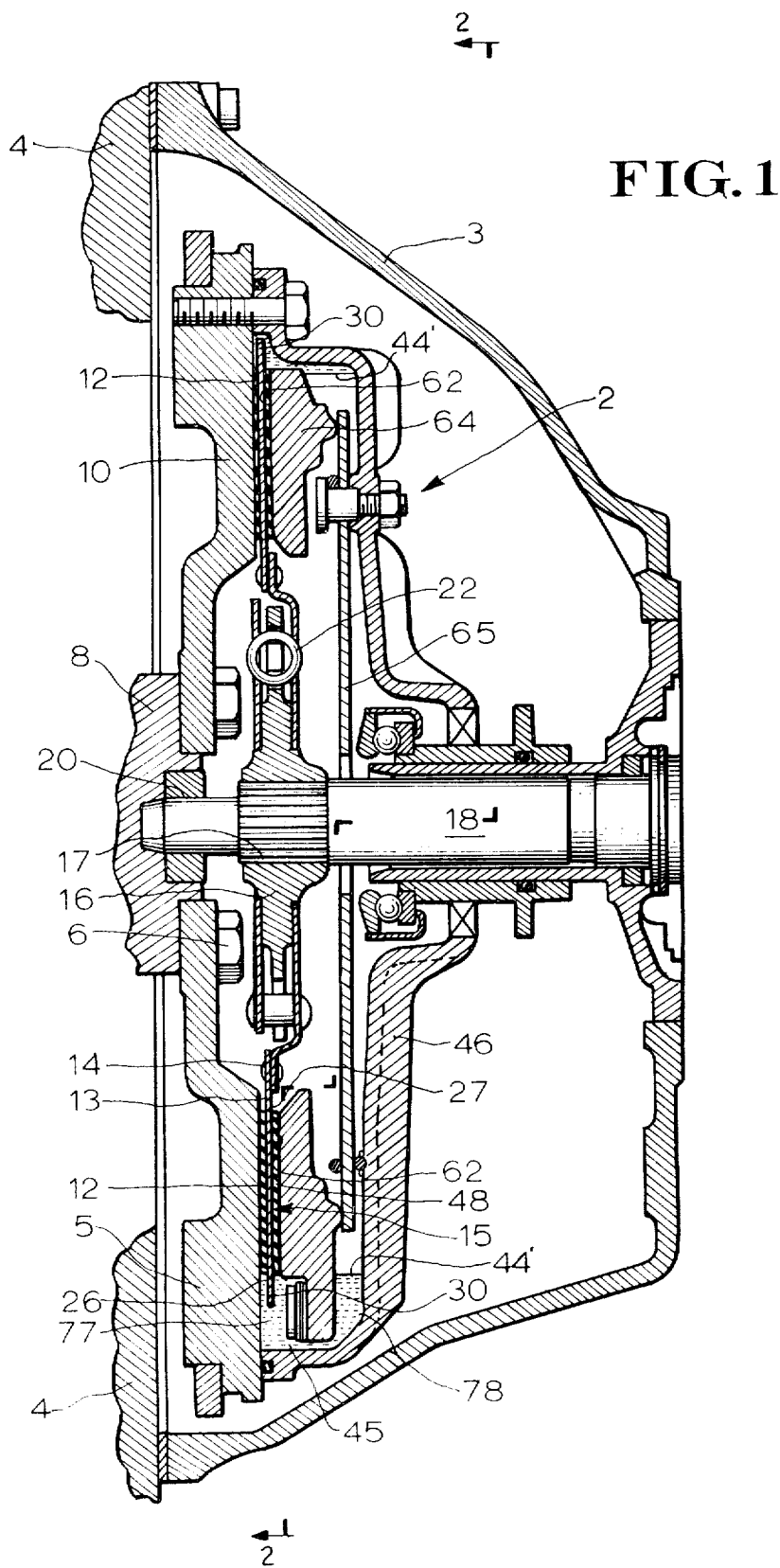
FIG. 1 is a radial sectional view of a clutch assembly shown in an operating condition incorporating the invention.
Figure 2:
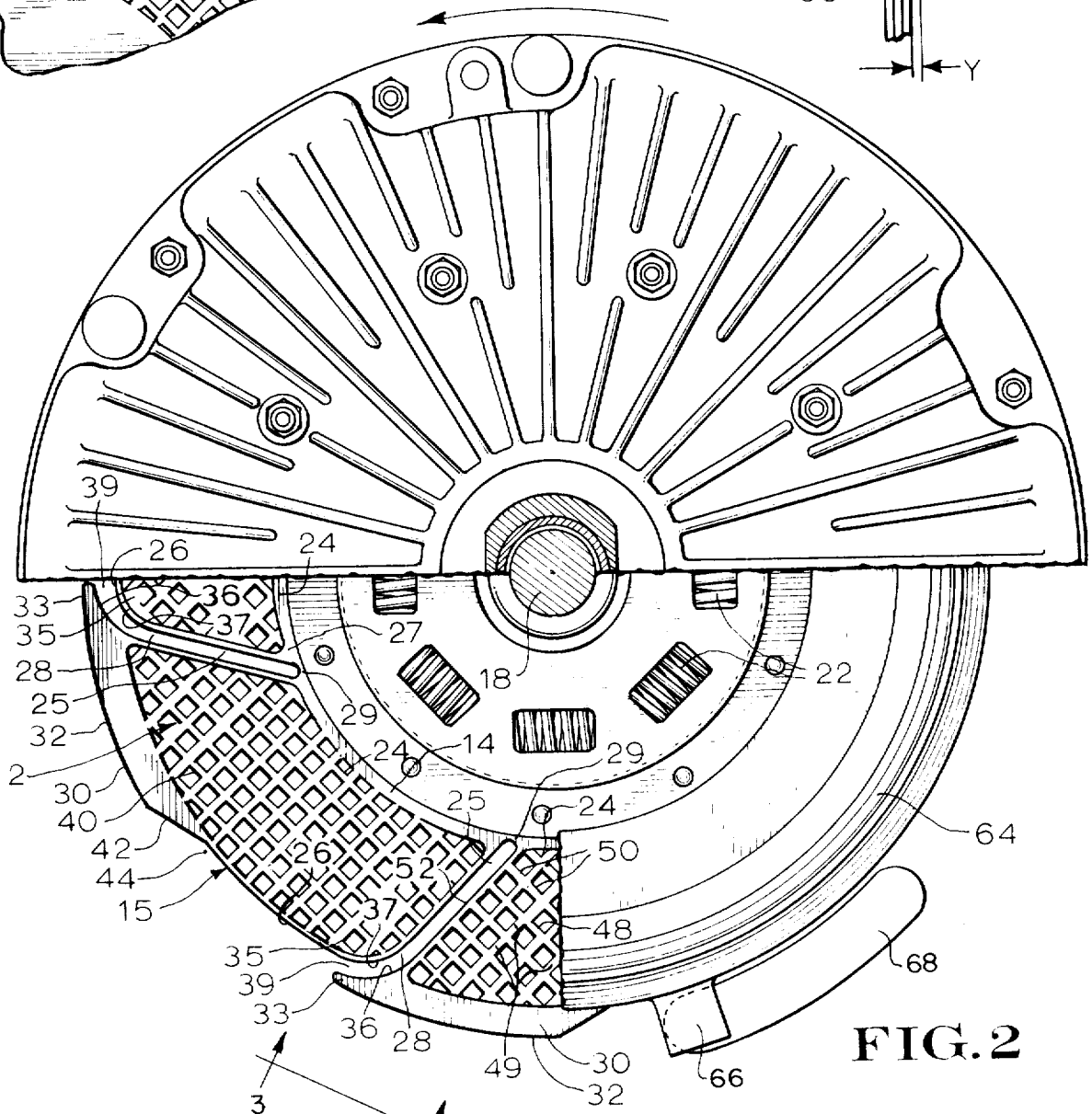
FIG. 2 is a partial transaxial sectional view of the structure shown in FIG. 1 taken substantially on line 2—2 of FIG. 1.
Figure 3:
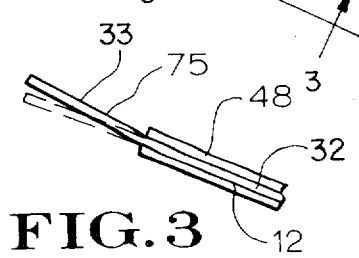
FIG. 3 is a fragmentary edge view of a portion of the clutch plate taken on the line 3—3 of FIG. 2 showing a modification thereof.

DESCRIPTION OF FIGS. 1 and 2

Describing the invention in detail, there is shown in FIG. 1 a clutch assembly generally designated 2 which comprises a bell-shaped housing 3 of generally conventional form secured to the engine block 4 about a flywheel 5, which is suitably secured as by bolts 6 to an engine output shaft 8.

The flywheel 5 provides a friction face or driving member 10 which is adapted to be engaged by friction linings or elements or pads 12 mounted on the forward side 13 of a driven member comprising a metal disk or plate 14 of a clutch disk unit 15. The clutch disk unit comprises a hub 16 which has a spline connection 17 to an output shaft 18 coaxial with the engine output shaft and piloted therein at 20.

A damping device 22 connects the hub 16 with the plate 14, said plate comprising a plurality of circumferentially spaced sections or segments 24 which define slots or fluid passages 25 therebetween. These slots extend diagonally from the outer periphery 26 of the plate portion to the inner peripheral portion 27 thereof and are oriented at a positive angle of inclination in the direction of rotation of the plate unit whereby the inner end 29 of each slot at the inner portion of the disk is disposed ahead of the outer end 28 of the slot at the periphery of the disk.

One of the principal features of the invention is the provision of a diverter or scoop 30 at the outer edge of each segment 24 of the disk 14. Each diverter is integrally formed as a projection with the segment as a stamping and has a width equal to the thickness of the segment. The diverter has an outer peripheral edge 32 and the forward or leading portion of the diverter is formed as a finger 33 which extends in a circumferential direction beyond the forward edge of the related segment in overlapping relation to the slot or passage immediately ahead of the segment. The finger extends in overlapping relation to the trailing portion 35 of the segment thereahead and tapers forwardly to form a pointed node. The inner edge of the finger is formed with a concave fluid guide or fluid scooping surface 36 which is generally parallel with curved edge 37 of the adjacent trailing portion of the segment thereahead and forms a forwardly directed inlet 39 therewith. The diverter is located on the forward portion 40 of its respective section or segment and has a trailing edge 42 which gradually slopes inwardly of the disk and merges into the annular peripheral edge of the disk which is located inwardly of the diverter. Thus behind each diverter there is formed an unobstructed large pocket 44 which is easily filled by the cooling fluid such as oil 44' from a sump 45 in the outer part of an inner clutch housing 46 as the clutch is rotated.

It should be understood that the terms used referring to portion 35 as a trailing portion and the finger 33 as a leading portion refer to leading and trailing portions with respect to the direction of relative rotation between driving member 10 and driven member 14. Disk 14 is rotating in the same direction as driving member 10, as indicated by the arrow in FIG. 2. However, until full engagement, the clutch disk 14 rotates slower than driving member 10. Disk 14 thus has a direction of relative rotation with respect to driving member 10 opposite to the arrow in FIG. 2 or in a clockwise direction.

Each segment of the clutch plate is faced on its forward and rear sides with friction linings or pads 12 and 48 of preferably non-metallic well known materials and constrained for rotation therewith either by rivets securing the same or bonding with any suitable well-known adhesives. Each of the pads 12 and 48 has a waffle grid formed thereon by intersecting grooves 49 and 50.

Referring now to FIG. 1 it will be noted that the pads 12 are adapted to engage the flat friction face 10 on the flywheel and that the pads 48 are adapted to engage a flat friction face 62 on the pressure plate 64 which is adapted to be actuated between engaged and release positions by any suitable mechanism 65 as well known to those skilled in the art. A series of lugs 66, one being shown in FIG. 2, extend radially outwardly of the pressure plate 64 and are suitably joined to straps 68 which are connected to the cover member or housing 46.

EMBODIMENT OF FIG. 3

In this embodiment parts identical with the previous embodiment are identified by the same reference numeral. In the previous embodiment the diverters were located in a common plane with the disk, it being understood however, that the segments are formed of spring steel or the like metal and are somewhat deflectible axially of the clutch. In the instant embodiment every other diverter is bent laterally or axially of the plate and in addition to the forward diverter ramp surface of the previous embodiment presents a side surface 75 which is effective to scoop the fluid from the sump and pump the same into the associated slot radially inwardly of the disk. The deviation of the diverter is preferably only a few degrees on the order of no more than 10° from the plane of the plate.

In each of these embodiments it will be noted that the diverters extend into an annular channel 77 which is developed between a laterally offset portion 78 of the housing assembly and the opposing flywheel, both of which project radially outwardly of the driven plate unit 15.

Figure 4:
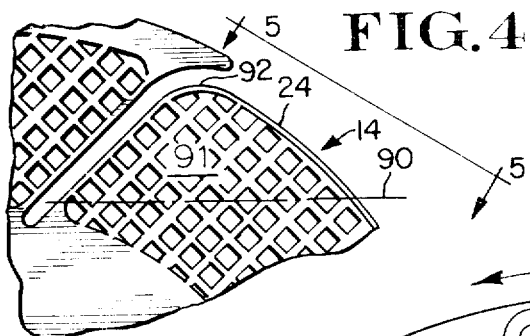
FIG. 4 is a view of a portion of another modified clutch plate.
Figure 5:
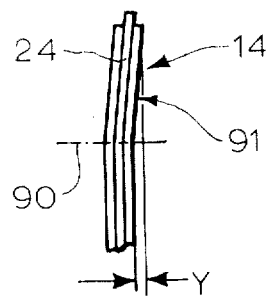
FIG. 5 is a fragmentary edge view of the portion of the clutch plate taken on the line 5—5 of FIG. 4.

EMBODIMENT OF FIGS. 4 and 5

In this embodiment an optional form of plate 14 is illustrated wherein all or selective numbers of the segments 24 may have an outer corner portion 91 offset from the general radial plane of the plate 14 as shown in FIG. 5. The corner portions 91 are offset by bending the corner portions 91 slightly about an axis 90. For example, the outer corner 92 may be offset a distance Y from the plane of the plate 14 in a direction toward driving member 10. In one embodiment the amount of the offset used was approximately 0.020 to 0.035 inches which gives the desired result. The offset of corner portions 91 provides an advantage in that the disengagement of member 14 from member 10 is facilitated by the spring like action of corner portions 91.

Having described various embodiments of the invention, various other modifications will now become apparent to those skilled in the art within the scope of the appended claims;

What is claimed is:

1. A clutch assembly comprising driving and driven members rotatable about a common axis, said members having relative rotation when said clutch assembly is disengaged or when said clutch is not fully engaged, at least one of said members comprising a plate having friction clutching surface means thereon, and diagonal through slots subdividing said plate into a series of circumferentially spaced segments, the other of said members including a flywheel and a pressure plate flanking said first mentioned plate and in engaged position closing the lateral sides of said slots in said first mentioned plate and defining fluid passage means within said slots, and diverter means on the outer periphery of each segment providing a coolant fluid scooping surface projecting in a direction counter to the direction of relative rotation between said members such as to direct fluid into the adjacent slot.

2. The invention according to claim 1 wherein said friction means comprises a friction lining on each face of each segment having grooves communicating with respective slots.

3. The invention according to claim 1 wherein the other said members form a clutch housing encompassing said plate and defining an annular fluid guide channel for confining coolant fluid in proximity of said diverter means.

4. The invention according to claim 1 wherein an outer portion of at least one of said segments is offset from the general radial plane of said segment to facilitate separation of said members when said clutch is to be disengaged.

5. A clutch assembly comprising driving and driven members rotatable about a common axis, said members having relative rotation when said clutch assembly is disengaged or when said clutch is not fully engaged, at least one of said members comprising a plate having friction clutching surface means thereon, and diagonal slots subdividing said plate into a series of circumferentially spaced segments, and diverter means on the outer periphery of each segment comprising integral extensions of the plate projecting outwardly from the periphery of each segment and having a finger extending circumferentially in overlapping relation to a portion of the adjacent segment forwardly thereof in outwardly spaced relation thereto and defining a fluid inlet therewith providing a coolant fluid scooping surface projecting in a direction counter to the direction of relative rotation between said members such as to direct fluid into the adjacent slot.

6. The invention according to claim 5 wherein said diverter extensions are offset laterally of the plate to increase the scooping areas thereof.

7. A clutch assembly comprising driving and driven members rotatable about a common axis, said members having relative rotation when said clutch assembly is disengaged or when said clutch is not fully engaged, at least one of said members comprising a plate having friction clutching surface means thereon, and diagonal slots subdividing said plate into a series of circumferentially spaced segments, said friction clutching surface means comprising pads of friction material on opposite sides of each segment, each pad having intersecting grooves forming a waffle pattern, certain of said grooves intersecting an adjacent slot and extending toward the outer periphery of the plate, and diverter means on the outer periphery of each segment providing a coolant fluid scooping surface projecting in a direction counter to the direction of relative rotation between said members such as to direct fluid into the adjacent slot.

8. The invention according to claim 7 wherein the other of said members includes a pair of friction faces flanking said plate and in engaged position forming fluid passages in the plate with said slots and in said pads with said grooves.

9. The invention according to claim 8 and said diverter means comprising integral projections on the segments of the thickness thereof and each projection having a forwardly directed finger overlapping the slot in front of its respective segment.

10. In a clutch for connecting a driving shaft with a driven shaft wherein said clutch comprises a sealed housing having a sump with coolant fluid therein, said clutch including a driven plate partially immersed in said sump, said plate comprising a plurality of equally spaced diagonal slots extending inwardly from the outer periphery thereof, and having integral diverter projections of the thickness of the plate projecting radially outwardly therefrom an extent sufficient to dip into the sump pursuant to rotation of the clutch disk, each projection having a forwardly directed finger overlapping a slot located forwardly of the respective projection and spaced radially outwardly of the section of the plate ahead of the respective projection and forming with an opposing edge of said section of the plate an inlet to the respective slot, and said plate having friction means with grooves therein communicating with respective slots.

11. The invention according to claim 10 and said grooves extending from respective slots to the outer periphery of the plate whereby centrifugal action forces the fluid through the friction means.

12. The invention according to claim 11 and said projections being bent laterally of the plane to the plate to dispose a side surface of the finger and projection to form a scoop.

* * * * *